Feb. 6, 1940. J. C. WILSON 2,188,970
ELECTRIC TIMING SYSTEM
Filed Aug. 26, 1938   2 Sheets-Sheet 2

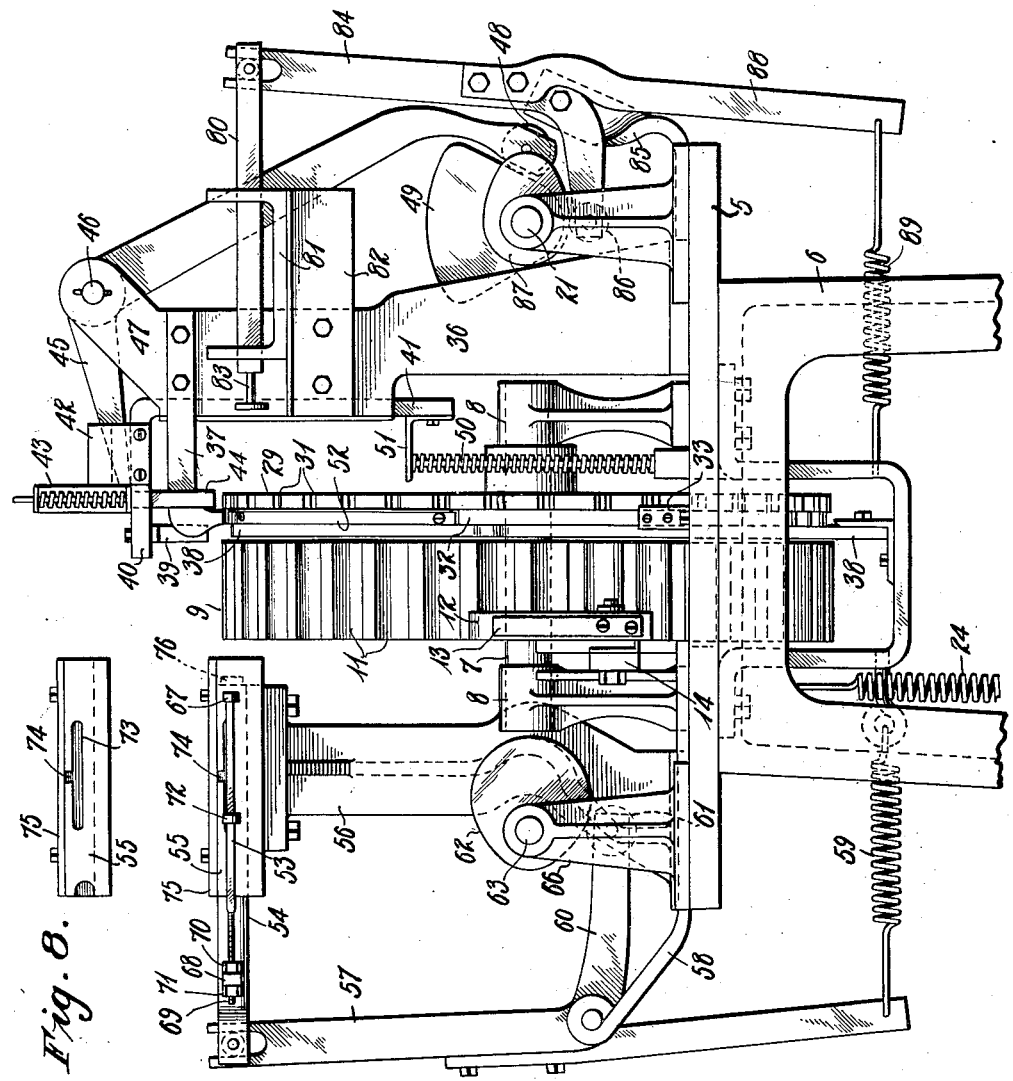

INVENTOR
JOHN C. WILSON
BY Lawrence B. Dodds
ATTORNEY

Sept. 9, 1924.  1,507,953
P. CODINA
SWAB ASSEMBLING MACHINE
Filed Jan. 31, 1923     5 Sheets-Sheet 4

Sept. 9, 1924.
P. CODINA
1,507,953
SWAB ASSEMBLING MACHINE
Filed Jan. 31, 1923    5 Sheets-Sheet 5
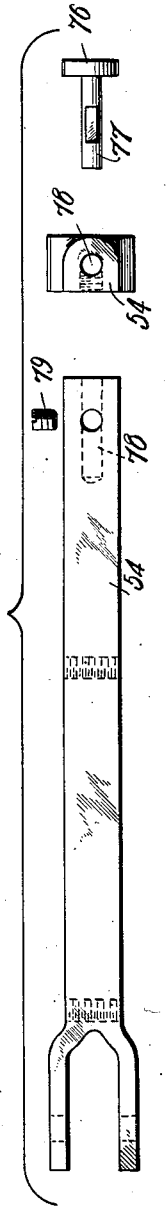
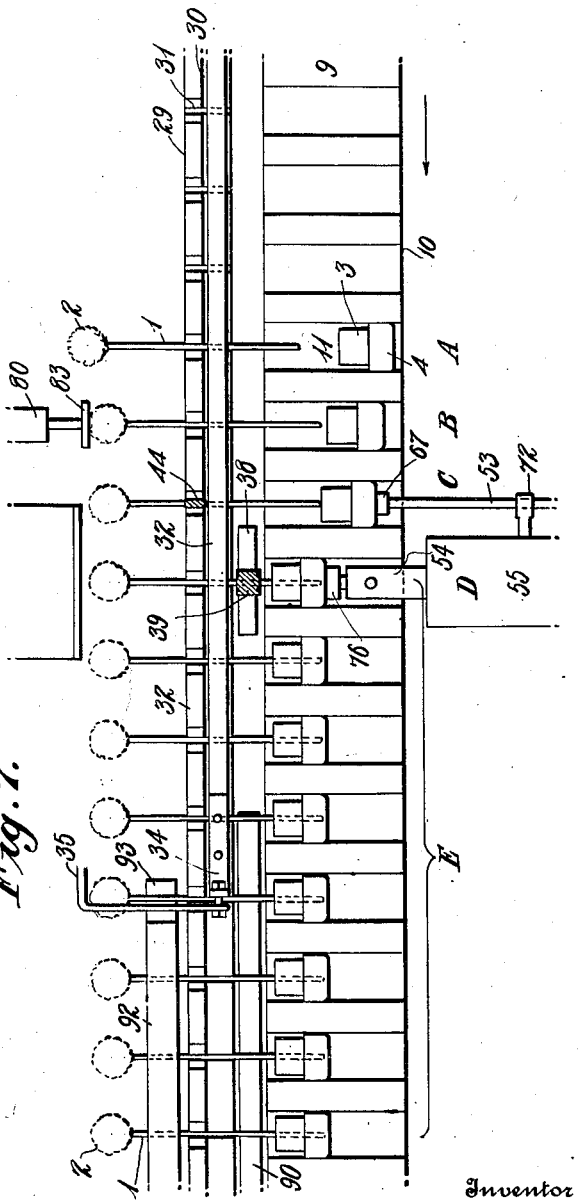

Patented Sept. 9, 1924.

1,507,953

UNITED STATES PATENT OFFICE.

PETER CODINA, OF JERSEY CITY, NEW JERSEY, ASSIGNOR TO THE DAUBER-SWAB CO., INC., OF JERSEY CITY, NEW JERSEY, A CORPORATION OF NEW JERSEY.

SWAB-ASSEMBLING MACHINE.

Application filed January 31, 1923. Serial No. 616,132.

*To all whom it may concern:*

Be it known that I, PETER CODINA, a subject of the King of Spain, residing at Jersey City, in the county of Hudson and State of New Jersey, have invented a certain new and useful Improvement in Swab-Assembling Machines, of which the following is a full, clear, and exact description.

The object of this invention is to provide a machine for assembling the parts of swabs or daubers, such as are particularly designed for use in applying liquid polish to footwear.

The invention consists of a machine adapted to receive the wire elements of the swab having the liquid-absorbing and distributing tuft attached thereto, and the handle, and bring these two elements into alinement and then force the handle onto the wires one by one while the latter are held stationary, as I will proceed now to explain and finally claim.

Figure 4:
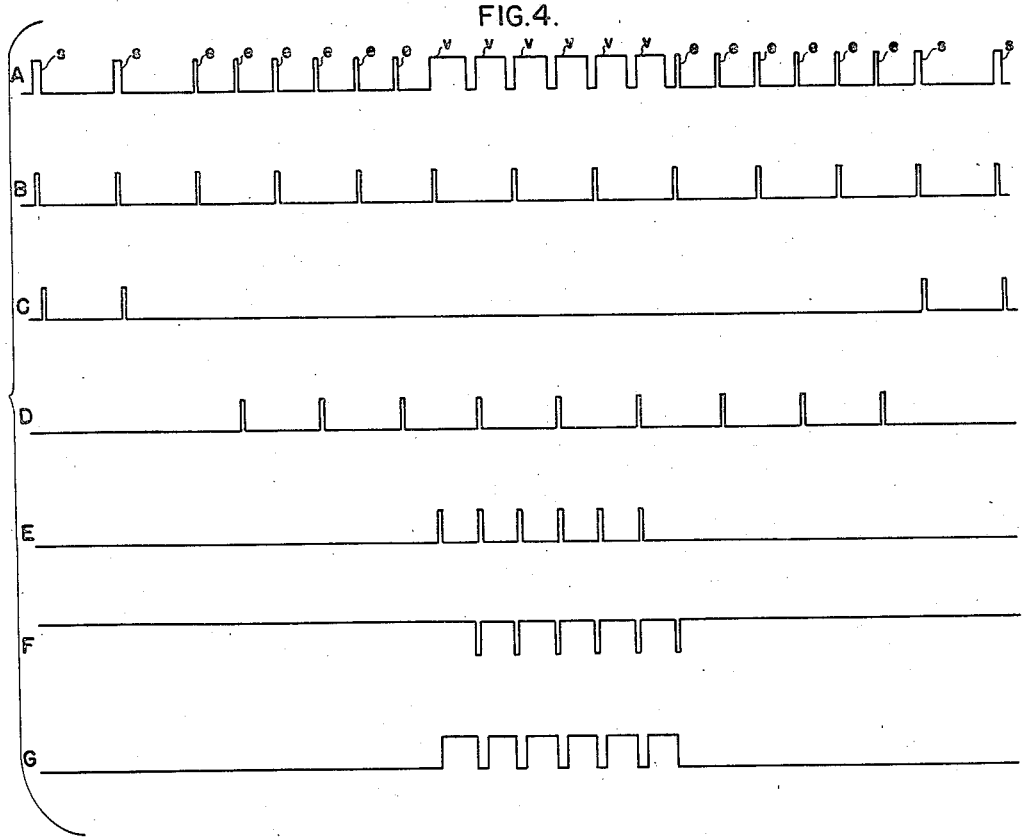
Figure 5:
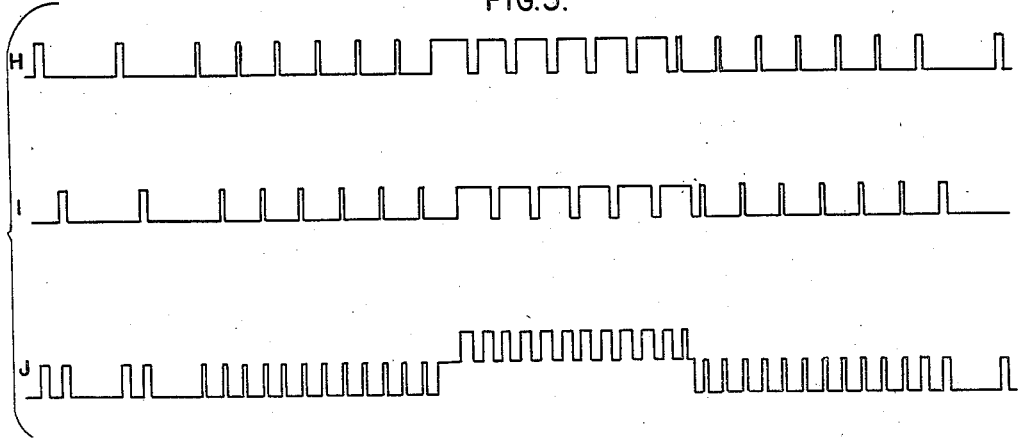
Figure 3:
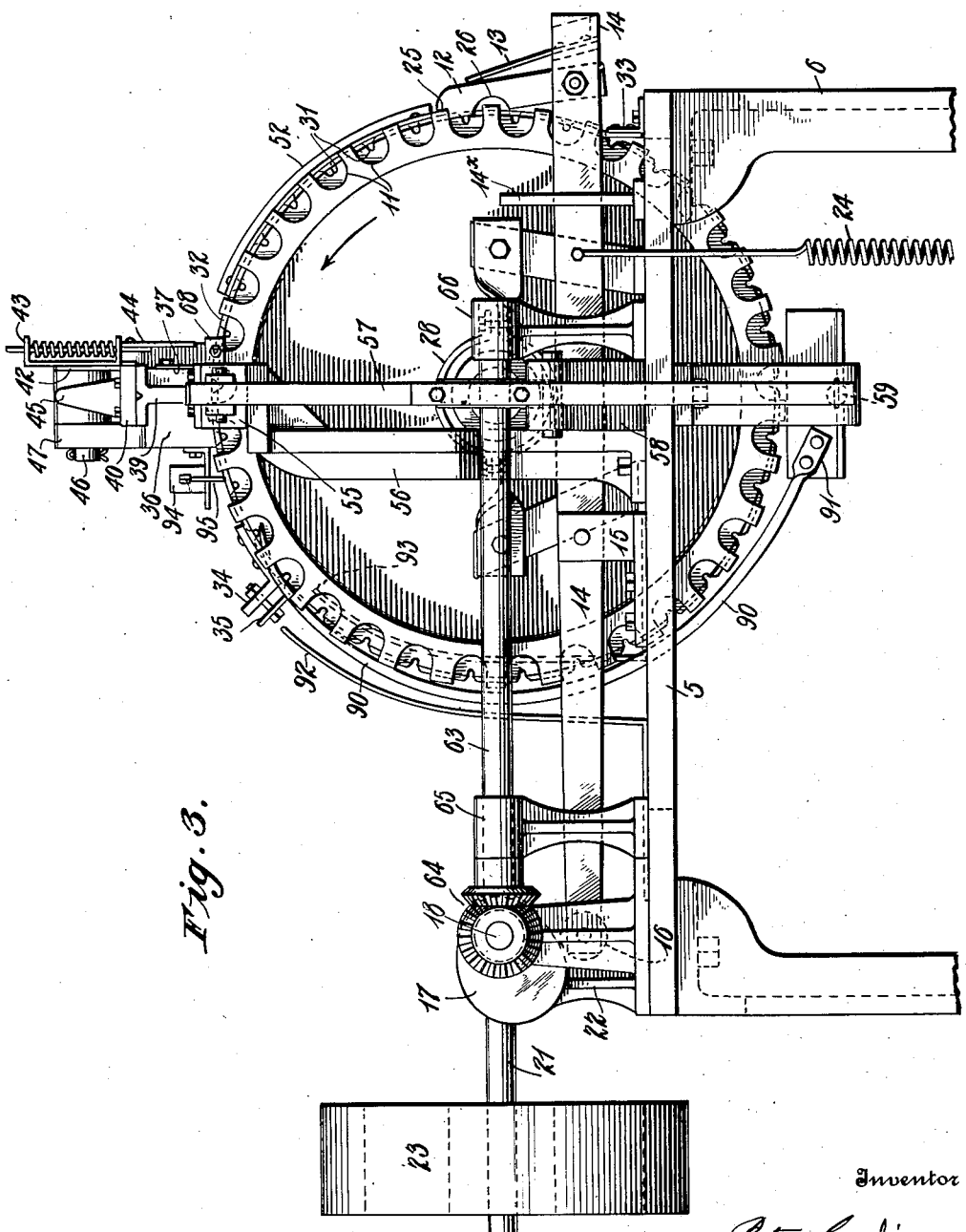
Figure 5:
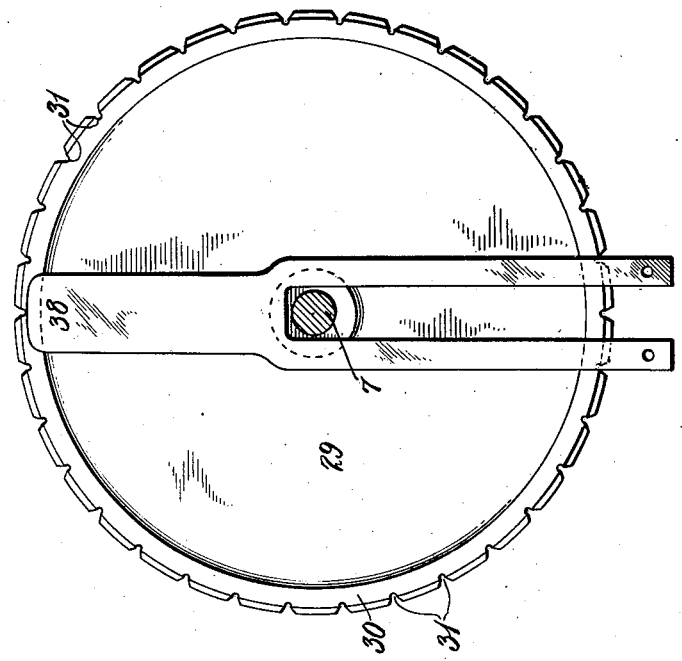
Figure 4:
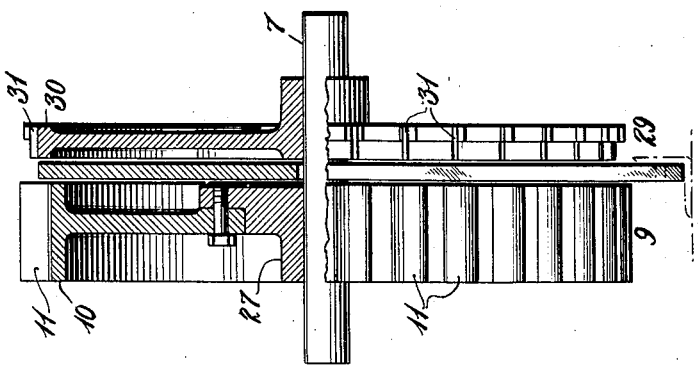

In the accompanying drawings illustrating the invention, in the several figures of which like parts are similarly designated, Figure 1 is a front elevation, Fig. 2 is a top plan view, and Fig. 3 is a side elevation of one form of machine constructed in accordance with my invention. Fig. 4 is a half section and edge view of the handle-carrying element hereinafter referred to as the handle-carrier, and the wire-carrying element, hereinafter referred to as the wire carrier, assembled, together with the adjunctive parts. Fig. 5 is an elevation of the wire carrier and the anvil member associated therewith. Fig. 6 is a view showing the parts of the handle pusher detached, Fig. 7 is a diagrammatic view showing the carriers and pushers and other parts to illustrate the successive operations of assembling the wires and handles. Fig. 8 is a side view of the handle pusher box.

Referring to Fig. 7, it is noted that the wire 1 and the liquid-absorbing tuft 2, may be of any approved type and are here so shown. The handle comprises a cork or bottle-stopper element 3 and a finish piece, cap or top 4 of wood or other suitable material to which the stopper element is fixed, as by cement. These parts constitute the swab or dauber so herein referred to.

The machine for assembling the parts of the swab or dauber comprises a table or bedpiece 5 mounted upon legs or frames 6 portions only of which are shown to accommodate the size of the drawing sheets, but which may be of appropriate structure and design.

7 is a shaft turning in bearing stands 8 erected on the table, and on this shaft is fixed a cylindrical wheel-like structure 9 having a laterally extended rim 10 provided with the transversely arranged recesses 11 of substantially U shape in cross-section to receive the handles of the swabs or daubers which, in the illustration shown, are placed therein lengthwise by hand, although the invention is not limited to a hand-feed. This device is herein referred to as the handle-carrier. Intermittent or step-by-step rotary motion may be imparted to the handle-carrier by any suitable means, and one such comprises a dog 12 backed up by a spring 13, to insure engagement of the dog with the edges of the recesses 11. The dog is pivoted to a lever 14 fulcrumed on a post 15 on the table, and the spring is fixed to this lever. The lever moves in a forked guide 14˟ rising from the table. The lever has a roller 16 on its other end which engages a cam 17 on a countershaft 18. This shaft 18 is mounted in bearings 19 on the table and is driven by miter-gears 20 from the driving shaft 21 also mounted on the table in bearings 22 and having the pulley 23 or other device for connection with the source of power. The lever 14 is held in contact with the cam by a spring 24 having one end fastened to any stationary part of the machine, such as the frame or legs thereof. The dog 12 has the notched end 25 so as to engage successively the edges of the recesses 11, and is cut out at 26 so as to span and clear the wall between adjacent recesses.

The handle-carrier has a hub 27 engaged by any suitable friction device, such as a brake strap or band 28 to prevent the overthrow of the carrier as it is moved step-bystep as above described, and also its reverse movement.

On the shaft 7 is mounted the wire carrier 29, and this wire carrier turns with the shaft synchronously with the handle-carrier. The rim 30 of the wire carrier is provided with transversely arranged grooves 31 to receive the tufted wire members of the swab or dauber which are laid therein by hand by the operator, although the invention is not limited to a hand-feed. Overlying the rim of the wire carrier is a band 32 fastened to the table at 33 and extending over past the vertical diameter of the rim and secured by an attaching device 34, adjustable or otherwise, to a bracket 35 fastened to any suitable fixed part of the machine, such as the guide post 36 erected on the table. This guide post also may have the bracket 37 to which the band 32 may be attached between its ends to reinforce it against the pushing elements. The grooves in the wire carrier are alined with the recesses in the handle carrier, and their relation is such that the wires in the wire carrier will be alined centrally with the handles.

Between the two carriers and straddling the shaft is an upright anvil member 38 fastened to the table and extending upwardly substantially to the level of the bottoms of the grooves in the wire carrier. With this anvil member cooperates a hold-down or presser 39 mounted on a bracket 40 made with or fast to a slide 41 in the face of the upright guide post 36. As a wire is brought opposite the presser to be connected with the handle, this hold-down or presser 39 is moved downwardly into contact with the wire, and the wire is thereby clamped between the hold-down or presser and the anvil. Also mounted on the bracket 40 is a plate 42 to which is fastened an angle frame 43 on which is mounted a spring-pressed blade 44 which simultaneously with the depression of the hold-down or presser is moved into contact with a wire in the wire carrier to hold the wire in position while the wire and handle are being pushed into alinement.

The hold-down or presser and the blade 44 are depressed by means of an elbow lever 45 pivoted at 46 on a bracket 47 on the post 36, one end of this lever coacting with the bracket 40 and the other end having a roller 48 which is engaged by a cam 49 mounted on the driving shaft 21. The return movement of the bracket is effected by an expansion spring 50 connected therewith by means of a bracket 51 and mounted on the table or bed plate 5.

It will be observed from Fig. 1 that the blade 44 is longer than the presser 39 and therefore in the downward movement of the bracket 40 the blade will reach the wire carrier before the presser reaches the handle, but a continuation of the downward movement of the bracket 40 is provided for by the action of the spring with which the blade is provided.

In order to safeguard the operator, a guard piece 52 may be mounted on the band 32 at the point where the operator stands, and overlying the wire carrier. It will be noticed that the surface of the rim of the wire carrier next to the handle-carrier is a little lower or of smaller diameter than the outer surface, and this for the purpose of receiving the band 32 which serves as a hold-down for the wires.

As already stated, the operator lays the handles and the wires in their respective carriers. Opposite the handle-carrier is a pusher 53 rigidly mounted on a bar 54, and this bar is arranged for longitudinal reciprocation in the box 55, and this box is mounted on a stand 56 erected on the table. The bar 54 is connected with a lever 57 pivoted on a bracket 58, and said bar is normally retracted by a spring 59 fast to some stationary part of the machine. This lever has an arm 60 on the end of which is a roller 61, and this roller contacts with a cam 62 mounted on a countershaft 63 which is connected with the countershaft 18 by miter gears 64, the countershaft 63 being mounted in bearings 65 and 66 fast on the table. I have shown the lever 57 as made with the upright and the roller carrying end in one piece and its lower portion made as a separate piece fastened thereto, but obviously the whole thing may be made as a single casting.

The pusher 53 has at its active end a head 67, and said pusher is adjustable longitudinally in a bearing 68 by means of the screwthreaded end 69 and the nuts 70 and 71 arranged upon opposite sides of the bearing 68.

72 is a bearing also fixed to bar 54 and projecting through a slot 73 in the side of the box as shown in Figs. 1, 2 and 8. That portion of the pusher 53 lying in the bearing 72 is angular, preferably square, so as to prevent the pusher from turning in its bearing. The slot 73 has a vertical inlet slot 74, so that the pusher and bar may be assembled first and then the bar introduced in the box and the box covered by the cover 75.

The bar 54, see Fig. 6, which also is a pusher member, is provided with a head 76 having the contour of the recesses 11, and this head is provided with a shank 77 inserted in a hole 78 running lengthwise of the leading end of the bar and adjustably held therein by means of a set-screw 79. The adjustability of the pusher 53 and the bar 54 is provided in order to insure that handles of different length shall have the full movement in the recesses 11 necessary to effect the proper union of the wire and handle.

After the operator has put the wires in the wire carrier they are successively operated upon by means of a pusher 80 mounted in a bracket 1 which is supported on a bracket 82 in turn fastened to the post 36. This pusher 80 likewise may have a head 83 adjustable longitudinally therein substantially as in the case of the pusher head 67 previously described to insure the proper location of the wires. The pusher 80 is reciprocated longitudinally by means of an L-shaped lever 84 fulcrumed on a bracket 85 mounted on the table, the lower end of the lever supporting a roller 86 which is acted upon by a cam 87 on the main driving shaft 21. This lever 84 has the extension 88 which is engaged by a spring 89 fastened to some stationary part of the machine, in order normally to retract the pusher 80. As shown, this lever 84 is made in two pieces, but obviously when made as a casting it may be in one piece.

90 is a curved bar mounted on some fixed part of the machine and preferably beneath the carrier, as at 91, and extending up into the space between the two carriers so as to engage the wire and eject the swab or dauber, and by reason of this function this bar is herein referred to as the ejector bar. In order to guard against the flying out of the swabs or daubers a guard 92 is arranged at the discharge end of the carriers, said guard being fastened to the table and extending up opposite the carriers adjacent the tufted ends of the wires, and alined with this guard is a curved bar 93 fastened to the table and rising therefrom and adapted to contact with the under surface of the tufted end of the wires to force them out of the wire carrier should they by any chance stick therein or be canted therein by the action of the ejector bar.

94 is a counter or register of any suitable construction, having its actuating arm 95 extending down into the path of movement of the wires of the assembled parts.

As shown in Fig. 2, the table 5 is slotted longitudinally at 96 for the reception of the carriers, and this slot is extended laterally at 97 for the escape or discharge of the finished and ejected swabs or daubers.

The operation of the machine has been sufficiently indicated in the foregoing description, but as a summary, it is stated that the machine is designed to be power driven, and the operator feeds handles to the handle-carrier and wires to the wire carrier, one for each recess and groove, respectively, and then the thus fed handles and wires are moved forward into position to be properly positioned with relation to one another by the pusher mechanisms described, the wire pusher having attained its full stroke while the handle pusher bar pushes the handle onto the wire and effects the union of the two, after which upon a further turn of the carriers, the united handle and wire are carried down and ejected from the carriers by the ejector bar 90.

This series of operations is illustrated diagrammatically in Fig. 7. At A are shown the wire and handle placed in their respective carriers. At B the wire pusher 76 has been advanced against the tuft end of the wire and shoved the wire toward the handle. At C the handle pusher 53 has been moved forward against the handle and shoved it and the wire into intimate contact, the wire meanwhile being pressed down by the blade 44 into the groove in the wire carrier. At D the wire is held down by the hold-down or presser 39 while the pusher bar 54 advances against the handle and forces it upon the wire. At E the assembled parts are shown ready to be discharged from the machine. The finished articles are held in the carriers until the end of the band 32 is reached and then the ejector bar 90 is free to dislodge them.

It will be understood that a wire and handle introduced at A is carried to B by the subsequent operation of the dog 12 on the carrier, and then to positions C, D and E successively by the successive operations of the dog. In other words, there are three operations carried on at one time, namely: 1, the introduction of a handle and wire; 2, the positioning of a handle and wire previously introduced, and 3, the assembling of a handle and wire introduced before those last mentioned.

The use herein of the term "swab assembling machine" is not to be taken or understood as a limitation of the invention, since it is obvious that the machine is equally applicable to assembling other devices or implements having similar or equivalent parts that may be united in the manner explained.

Variations in the details of construction and the arrangement of parts are considered to be within the principle of the invention as herein explained and as hereinafter claimed.

What I claim is:—

1. A swab assembling machine, comprising an intermittently rotated carrier for one of the swab elements, and a carrier for the other element arranged concentrically with the first named carrier and rotating synchronously therewith, means to position the elements on their respective carriers in substantial alinement one with the other, and means to fixedly connect these elements while in the carriers.

2. A swab assembling machine, comprising a circular carrier adapted to receive one of the elements of the swab, means to impart a step-by-step rotation to said carrier, a circular carrier mounted alongside of the first named carrier and turning with it and adapted to receive the other element of the swab, means to position these elements in their respective carriers in alinement with one another, means to hold down one of the elements, and means to drive the other element onto the element so held.

3. In a machine for assembling swabs and daubers made up of a handle member and a wire member, the combination of a circular handle-carrier and a circular wire carrier arranged side by side and turning together, means to impart a step-by-step motion to these carriers, means to hold the wires in position in the wire carrier, a reciprocating pusher to move the wire toward the handle, a reciprocating pusher to move the handle toward the wire, means to hold down the wire so last positioned, and means to drive the handle onto said wire.

4. In a machine for assembling swabs and daubers made up of a handle member and a wire member, the combination of a circular handle-carrier and a circular wire carrier arranged side by side and turning together, means to impart a step-by-step motion to these carriers, means to hold the wires in position in the wire carrier, a reciprocating pusher to move the wire toward the handle, a reciprocating pusher to move the handle toward the wire, means to hold down the wire so last positioned, means to drive the handle onto said wire, and means to eject the assembled handle and wire from the machine.

5. In a machine for assembling swabs and daubers made up of a handle member and a wire member, the combination of a circular handle-carrier and a circular wire carrier arranged side by side and turning together, means to impart a step-by-step motion to these carriers, means to hold the wires in position in the wire carrier, a reciprocating pusher to move the wire toward the handle, a reciprocating pusher to move the handle toward the wire, means to hold down the wire so last positioned, means to drive the handle onto said wire, and a curved bar fastened at one end and having its free end extending up between the carriers and in the path of travel of the swabs or daubers to eject them from the machine.

6. In a machine for assembling swabs and daubers made up of a handle member and a wire member, a circular handle-carrier provided with peripheral recesses arranged transversely therein and adapted to receive the handles, a rotary shaft on which said carrier is fixed, a circular wire carrier having peripheral notches to receive the wires, said wire carrier mounted on said shaft and turning with it, a band applied to the periphery of the wire carrier and serving to hold down the wires on said carrier, automatic means to place the handles and wires in operative juxtaposition, a stationary anvil located beneath the wires in the wire carrier, a presser cooperating with said anvil to hold the wire while the handle is being united therewith, means to force the handle onto the wire when so held, and means to impart a step-by-step rotary motion to the carriers.

7. In a machine for assembling swabs and daubers made up of a handle member and a wire member, a rotary shaft, a circular handle-carrier fixed to said shaft and having transverse handle receiving recesses in its periphery, means to impart a step-by-step rotation to said carrier, a pusher arranged normal to said recesses, a second pusher carrying the first pusher and spaced a distance of a recess beyond it, a rock lever connected with the second pusher, a rotary cam for actuating said lever, a circular wire carrier mounted on the said rotary shaft and having transverse peripheral grooves, a hold-down band partly encircling said wire carrier, a yielding hold-down blade, and a presser, a slide on which the blade and presser are mounted, a rock lever for moving the hold-down blade and presser into active position, a cam for actuating said lever, a wire pusher having a rectilinear movement, a rock lever for imparting said motion to said wire pusher, and a cam for actuating said rock lever.

8. In a machine for assembling swabs and daubers made up of a handle member and a wire member, the combination of a circular handle-carrier and a circular wire carrier arranged side by side and turning together, means to impart a step-by-step motion to these carriers, means to hold the wires in position on the wire carrier, a reciprocating pusher to move the wire toward the handle, a reciprocating pusher to move the handle toward the wire, means to hold the wire so last positioned, and means to drive the handle onto said wire, the several pushers provided with means for adjusting their length to the length of handles and wires being assembled.

9. In a machine for assembling swabs and daubers made up of a handle member and a wire member, the combination of a circular handle-carrier and a circular wire carrier arranged side by side and turning together, means to impart a step-by-step motion to these carriers, means to set and means to assemble the handle and wire members, means to eject the assembled devices, and means to confine the ejected devices within the discharge area.

10. In a machine for assembling swabs and daubers made up of a handle member and a wire member, the combination of a circular handle-carrier and a circular wire carrier arranged side by side and turning together, means to impart a step-by-step motion to these carriers, means to set and means to assemble the handle and wire members, means to eject the assembled devices, and means to dislodge the wire member should its escape from the wire carrier be obstructed.

In testimony whereof I have hereunto set my hand this 30th day of January, A. D. 1923.

PETER CODINA.

Witnesses:
 ELIZABETH GURNEY,
 E. D. GERCKEN.